US012658579B2

(12) United States Patent
Tseng et al.

(10) Patent No.: US 12,658,579 B2
(45) Date of Patent: Jun. 16, 2026

(54) ANTENNA STRUCTURE

(71) Applicant: Quanta Computer Inc., Taoyuan City (TW)

(72) Inventors: Yi-Ling Tseng, Taoyuan City (TW); Chin-Lung Tsai, Taoyuan City (TW); Chung-Ting Hung, Taoyuan City (TW); Kai-Hsiang Chang, Taoyuan City (TW); Yu-Chen Zhao, Taoyuan City (TW); Chun-I Cheng, Taoyuan City (TW)

(73) Assignee: QUANTA COMPUTER INC., Taoyuan City (TW)

(*) Notice: Subject to any disclaimer, the term of this patent is extended or adjusted under 35 U.S.C. 154(b) by 59 days.

(21) Appl. No.: 18/979,869

(22) Filed: Dec. 13, 2024

(65) Prior Publication Data

US 2026/0128517 A1 May 7, 2026

(30) Foreign Application Priority Data

Nov. 5, 2024 (TW) ................................ 113211995

(51) Int. Cl.

*H01Q 1/38* (2006.01)
*H01Q 1/48* (2006.01)
*H01Q 1/50* (2006.01)
*H01Q 5/30* (2015.01)

(52) U.S. Cl.

CPC ................. *H01Q 5/30* (2015.01); *H01Q 1/38* (2013.01); *H01Q 1/50* (2013.01)

(58) Field of Classification Search

CPC .. H01Q 1/24; H01Q 1/38; H01Q 1/48; H01Q 1/50; H01Q 5/30

See application file for complete search history.

(56) References Cited

U.S. PATENT DOCUMENTS

| | | | | |
|---|---|---|---|---|
| 6,646,607 B2 * | 11/2003 | Usui | H01Q 1/2266 343/702 |
| 11,050,148 B2 * | 6/2021 | Lo | H01Q 5/385 |
| 11,128,050 B1 * | 9/2021 | Chuang | H01Q 5/371 |
| 11,749,891 B2 * | 9/2023 | Li | H01Q 5/371 343/904 |
| 12,132,270 B2 * | 10/2024 | Zhang | H01Q 9/0421 |
| 12,542,366 B2 * | 2/2026 | Chang | H01Q 5/371 |

* cited by examiner

*Primary Examiner* — Tho G Phan

(74) *Attorney, Agent, or Firm* — McClure, Qualey & Rodack, LLP

(57) ABSTRACT

An antenna structure includes a ground element, a feeding radiation element, a connection radiation element, a conductive via element, a first radiation element, a second radiation element, a third radiation element, and a nonconductive support element. The feeding radiation element is coupled through the connection radiation element to the ground element. The conductive via element is coupled to the feeding radiation element. The first radiation element, the second radiation element, and the third radiation element are coupled to the conductive via element. A slot is formed between the first radiation element and the second radiation element. The nonconductive support element has a first surface and a second surface which are opposite to each other. The conductive via element penetrates the nonconductive support element. The ground element, the feeding radiation element, and the connection radiation element are disposed on the first surface of the nonconductive support element.

10 Claims, 4 Drawing Sheets

ANTENNA STRUCTURE

CROSS REFERENCE TO RELATED APPLICATIONS

This application claims priority of Taiwan Patent Application No. 113211995 filed on Nov. 5, 2024, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a ground element, a feeding radiation element, a connection radiation element, a conductive via element, a first radiation element, a second radiation element, a third radiation element, and a nonconductive support element. The feeding radiation element has a feeding point. The feeding radiation element is coupled through the connection radiation element to the ground element. The conductive via element is coupled to the feeding radiation element. The first radiation element is coupled to the conductive via element. The second radiation element is coupled to the conductive via element. A slot is formed between the first radiation element and the second radiation element. The third radiation element is coupled to the conductive via element. The nonconductive support element has a first surface and a second surface which are opposite to each other. The conductive via element penetrates the nonconductive support element. The ground element, the feeding radiation element, and the connection radiation element are disposed on the first surface of the nonconductive support element. The first radiation element, the second radiation element, and the third radiation element are disposed on the second surface of the nonconductive support element.

In some embodiments, the connection radiation element substantially has an L-shape.

In some embodiments, the connection radiation element has a vertical projection on the second surface of the nonconductive support element, and the vertical projection at least partially overlaps the first radiation element.

In some embodiments, the conductive via element substantially has a conical shape.

In some embodiments, the second radiation element further includes a protruding portion, and the protruding portion substantially has a rectangular shape.

In some embodiments, the slot is a monopole slot with a closed end and an open end.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element and the first radiation element is substantially equal to 0.25 wavelength of the first frequency band.

In some embodiments, the total length of the feeding radiation element and the second radiation element is substantially equal to 0.25 wavelength of the second frequency band.

In some embodiments, the total length of the feeding radiation element and the third radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
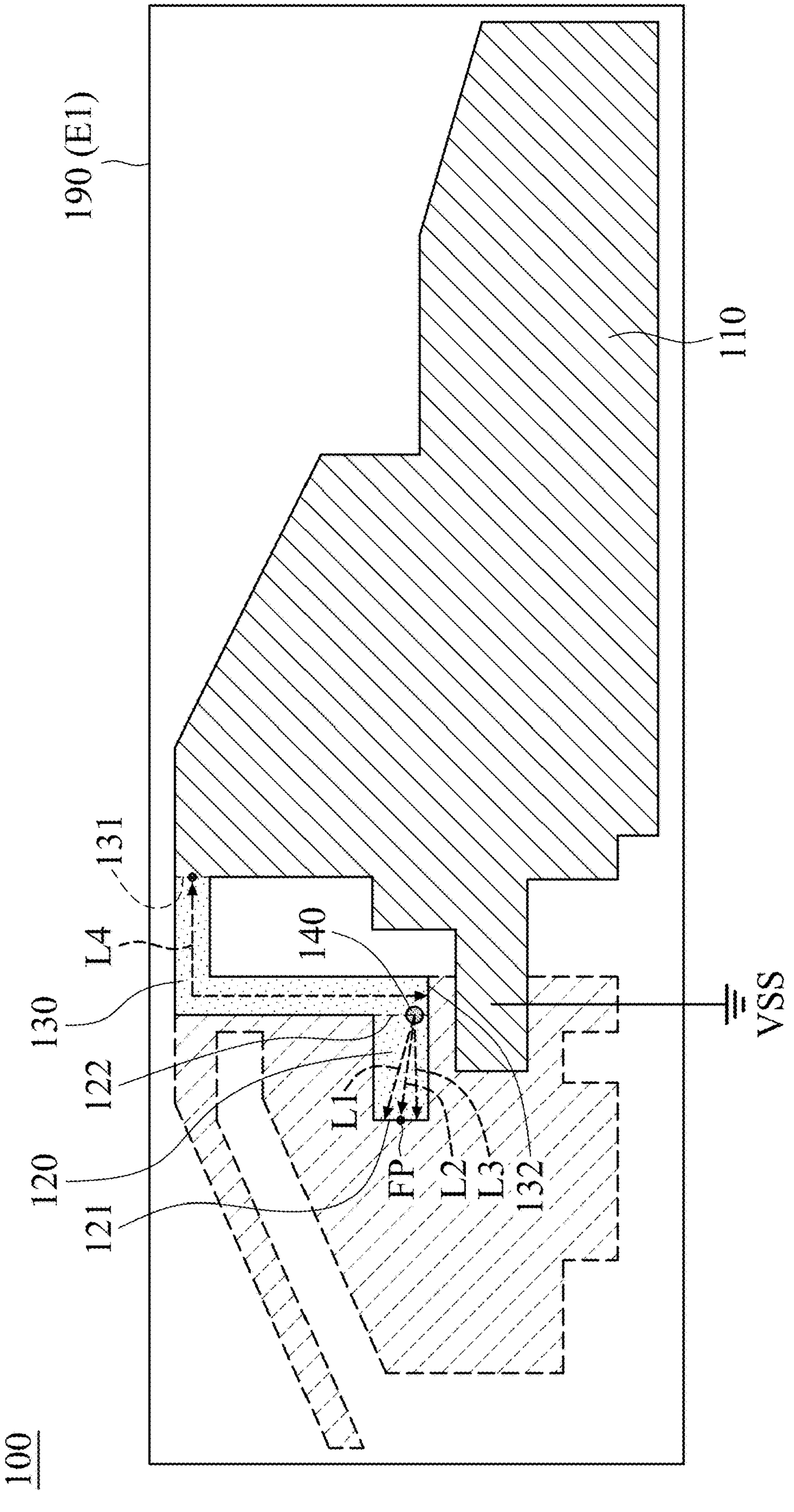
FIG. 1 is a back view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
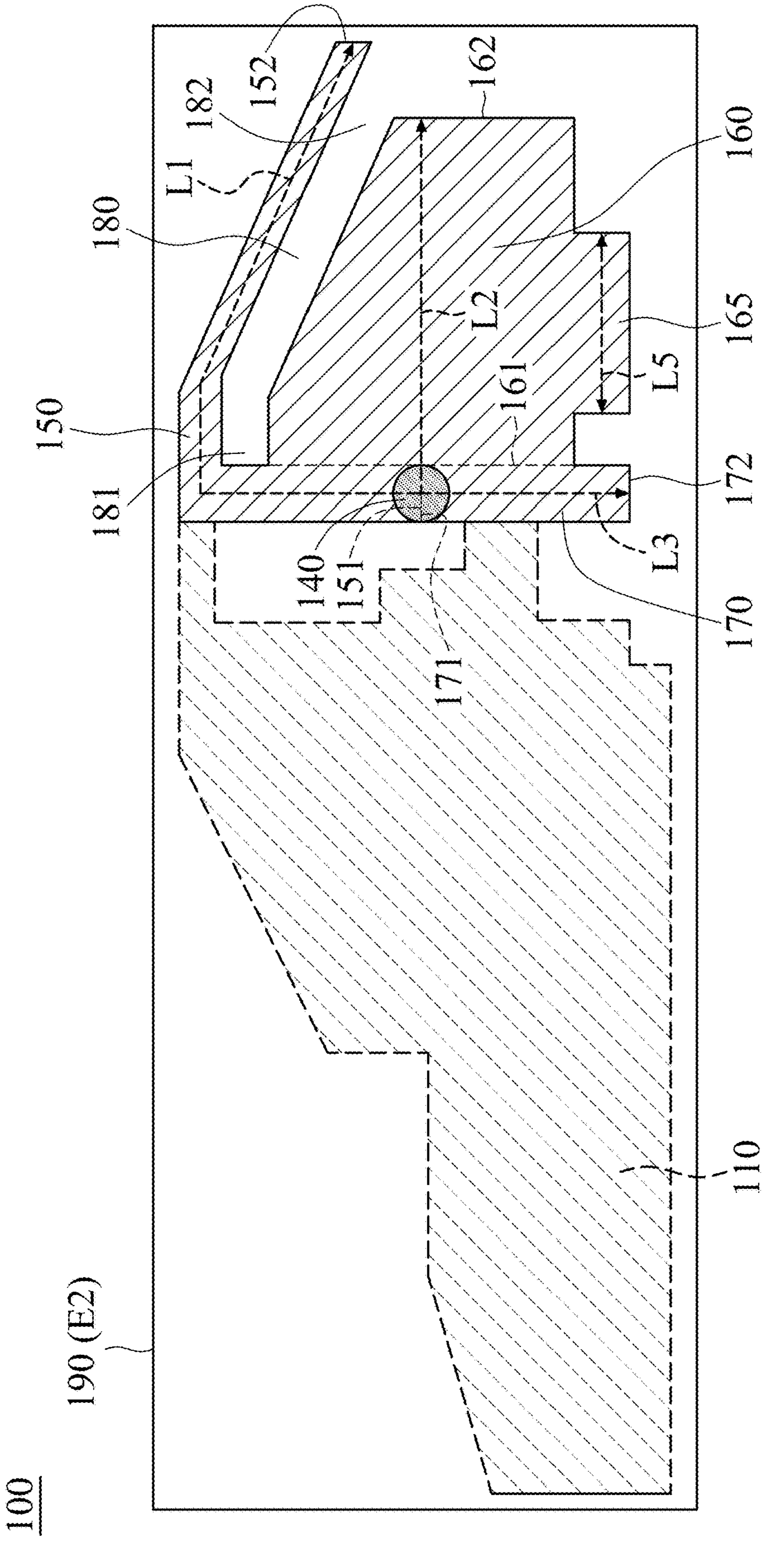
FIG. 2 is a front view of the antenna structure according to an embodiment of the invention.
Figure 3:
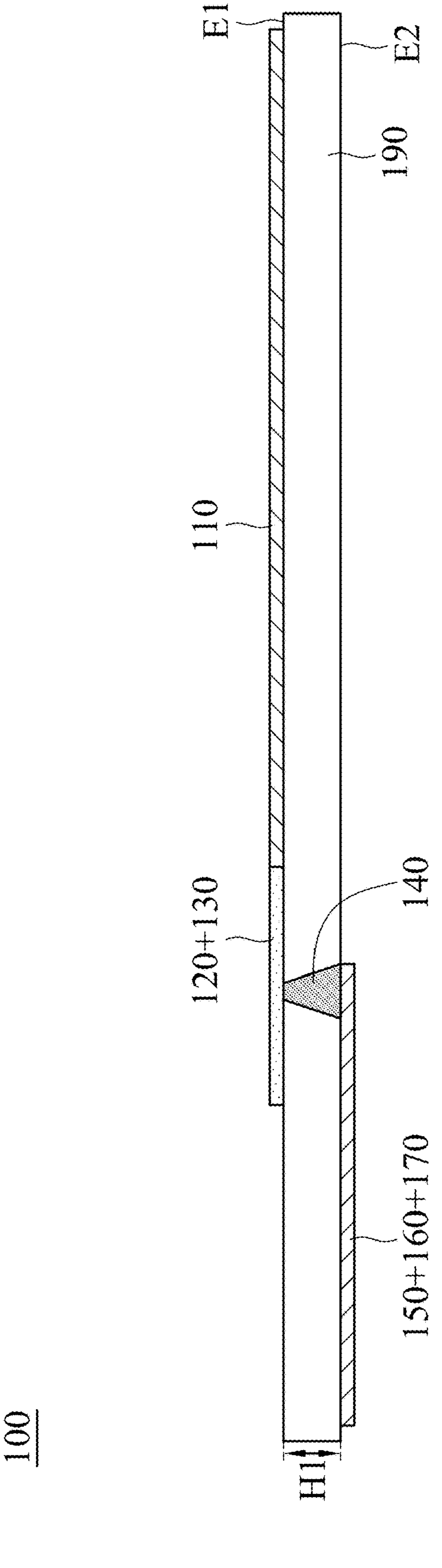
FIG. 3 is a side view of the antenna structure according to an embodiment of the invention.

FIG. 1 is a back view of an antenna structure 100 according to an embodiment of the invention. FIG. 2 is a front view of the antenna structure 100 according to an embodiment of the invention. FIG. 3 is a side view of the antenna structure 100 according to an embodiment of the invention. Please refer to FIG. 1, FIG. 2 and FIG. 3 together. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

As shown in FIG. 1, FIG. 2 and FIG. 3, the antenna structure 100 includes a ground element 110, a feeding radiation element 120, a connection radiation element 130, a conductive via element 140, a first radiation element 150, a second radiation element 160, a third radiation element 170, and a nonconductive support element 190. The ground element 110, the feeding radiation element 120, the connection radiation element 130, the conductive via element 140, the first radiation element 150, the second radiation element 160, and the third radiation element 170 may all be made of metal materials, such as copper, silver, aluminum, iron, or an alloy thereof.

The ground element 110 may substantially have an irregular shape. The ground element 110 is coupled to a ground voltage VSS. In some embodiments, the ground voltage VSS is provided by a system ground plane (not shown).

The feeding radiation element 120 may substantially have a straight-line shape. Specifically, the feeding radiation element 120 has a first end 121 and a second end 122. A feeding point FP is positioned at the first end 121 of the feeding radiation element 120. The feeding point FP may be further coupled to a positive electrode of a signal source (not shown). A negative electrode of the signal source may be coupled to the ground element 110. For example, the signal source may be an RF (Radio Frequency) module for exciting the antenna structure 100. In some embodiments, the antenna structure 100 further includes a coaxial cable with a central conductor and a conductive housing (not shown). The positive electrode of the signal source may be coupled through the central conductor of the coaxial cable to the feeding point FP. The negative electrode of the signal source may be coupled through the conductive housing of the coaxial cable to the ground element 110.

The connection radiation element 130 may substantially have an L-shape. Specifically, the connection radiation element 130 has a first end 131 and a second end 132. The first end 131 of the connection radiation element 130 is coupled to the ground element 110. The second end 132 of the connection radiation element 130 is coupled to the second end 122 of the feeding radiation element 120. That is, the feeding radiation element 120 is coupled through the connection radiation element 130 to the ground element 110.

Please refer to FIG. 3 again. The nonconductive support element 190 has a first surface E1 and a second surface E2 which are opposite to each other. The ground element 110, the feeding radiation element 120, and the connection radiation element 130 are all disposed on the first surface E1 (or the back surface) of the nonconductive support element 190. The first radiation element 150, the second radiation element 160, and the third radiation element 170 are all disposed on the second surface E2 (or the front surface) of the nonconductive support element 190. In some embodiments, the ground element 110, the feeding radiation element 120, the connection radiation element 130, the first radiation element 150, the second radiation element 160, and the third radiation element 170 are formed on the nonconductive support element 190 using LDS (Laser Direct Structuring) technology, but they are not limited thereto.

The conductive via element 140 is coupled to the second end 122 of the feeding radiation element 120 and the second end 132 of the connection radiation element 130. The conductive via element 140 can penetrate the nonconductive support element 190. In some embodiments, the conductive via element 140 substantially has a conical shape. The tip of the conical shape may be adjacent to the first surface E1 of the nonconductive support element 190. The base of the conical shape may be adjacent to the second surface E2 of the nonconductive support element 190. It should be noted that the term "adjacent" or "close" throughout the disclosure means that the distance between (or the spacing of) two corresponding elements is less than a predetermined distance (e.g., 10 mm or the shorter), or it may mean that the two corresponding elements directly touch each other (i.e., the aforementioned distance/space between them is reduced to 0).

The first radiation element 150 may substantially have a 7-shape. Specifically, the first radiation element 150 has a first end 151 and a second end 152. The first end 151 of the first radiation element 150 is coupled to the conductive via element 140. The second end 152 of the first radiation element 150 is an open end. In some embodiment, the connection radiation element 130 has a vertical projection on the second surface E2 of the nonconductive support element 190, and the vertical projection at least partially overlaps the first radiation element 150.

The second radiation element 160 may substantially have a pentagonal shape. Specifically, the second radiation element 160 has a first end 161 and a second end 162. The first end 161 of the second radiation element 160 is coupled to the conductive via element 140. The second end 162 of the second radiation element 160 is an open end. Also, the second radiation element 160 is further coupled to the first radiation element 150 and the third radiation element 170. In some embodiments, the second radiation element 160 further includes a protruding portion 165. For example, the protruding portion 165 of the second radiation element 160 may substantially have a rectangular shape. In some embodiments, a slot 180 is formed between the first radiation element 150 and the second radiation element 160. For example, the slot 180 may be a monopole slot with a closed end 181 and an open end 182.

The third radiation element 170 may substantially have another straight-line shape, which may be substantially perpendicular to the feeding radiation element 120. Specifically, the third radiation element 170 has a first end 171 and a second end 172. The first end 171 of the third radiation element 170 is coupled to the conductive via element 140. The second end 172 of the third radiation element 170 is an open end, which may be adjacent to the protruding portion 165 of the second radiation element 160. In some embodiments, the third radiation element 170 and at least one portion of the first radiation element 150 are arranged in the same straight line.

Figure 4:
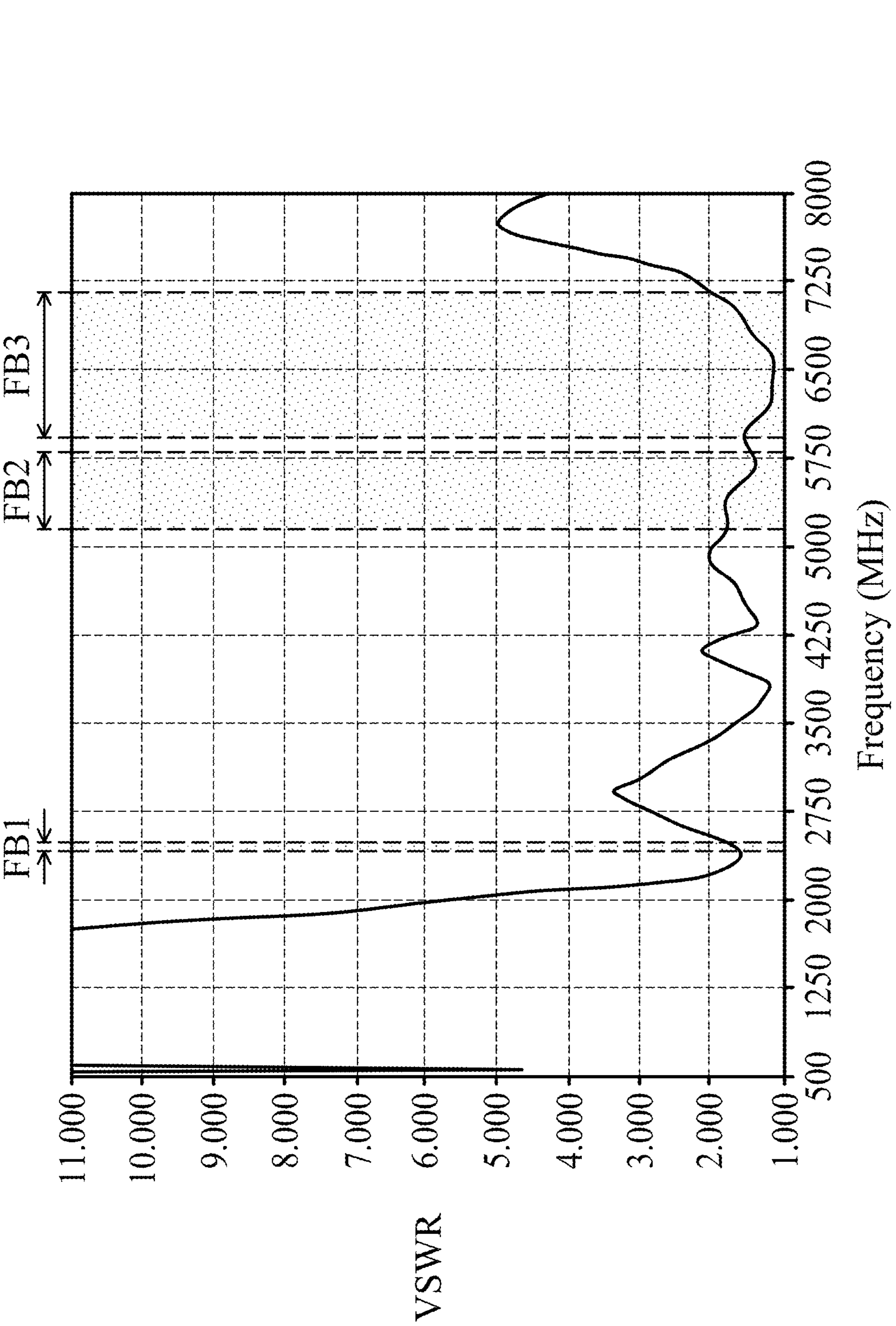
FIG. 4 is a diagram of VSWR (Voltage Standing Wave Ratio) of an antenna structure according to an embodiment of the invention.

FIG. 4 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 4, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 100 can support at least the wideband operations of WLAN (Wireless Local Area Network), Wi-Fi 6E, and Wi-Fi 7.

In some embodiments, the operational principles of the antenna structure 100 are as follows. The feeding radiation element 120, the conductive via element 140, and the first radiation element 150 can be excited to generate the first frequency band FB1. The feeding radiation element 120, the conductive via element 140, and the second radiation element 160 can be excited to generate the second frequency band FB2. The feeding radiation element 120, the conductive via element 140, and the third radiation element 170 can be excited to generate the third frequency band FB3. A coupling mechanism can be induced between the connection radiation element 130 and the first radiation element 150, so as to fine-tune the impedance matching of the first frequency band FB1 and the third frequency band FB3. In addition, the protruding portion 165 of the second radiation element 160 is configured to fine-tune the impedance matching of the second frequency band FB2.

In some embodiments, the element sizes of the antenna structure 100 are as follows. The total length L1 of the feeding radiation element 120 and the first radiation element 150 may be substantially equal to 0.25 wavelength (λ/4) of the first frequency band FB1 of the antenna structure 100. The total length L2 of the feeding radiation element 120 and the second radiation element 160 may be substantially equal to 0.25 wavelength (λ/4) of the second frequency band FB2 of the antenna structure 100. The total length L3 of the feeding radiation element 120 and the third radiation element 170 may be substantially equal to 0.25 wavelength (λ/4) of the third frequency band FB3 of the antenna structure 100. The length LA of the connection radiation element 130 may be from 10 mm to 14 mm. The length L5 of the protruding portion 165 of the second radiation element 160 may be from 4 mm to 6 mm. The thickness H1 of the nonconductive support element 190 may be from 0.5 mm to 1.5 mm. The above ranges of element sizes are calculated and obtained according to many experimental results, and they help to optimize the operational bandwidth and the impedance matching of the antenna structure 100.

In some embodiments, the aforementioned antenna structure 100 is applied in a POS (Point of Sale) system (not shown). Since the POS system includes the aforementioned antenna structure 100, the POS system can support the function of wireless communication. In some embodiments, the POS system further includes an RF circuit, a filter, an amplifier, a processor, and/or a housing, but it is not limited thereto.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1-4. The invention may merely include any one or more features of any one or more embodiments of FIGS. 1-4. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a feeding radiation element, having a feeding point;

a connection radiation element, wherein the feeding radiation element is coupled through the connection radiation element to the ground element;

a conductive via element, coupled to the feeding radiation element;

a first radiation element, coupled to the conductive via element;

a second radiation element, coupled to the conductive via element, wherein a slot is formed between the first radiation element and the second radiation element;

a third radiation element, coupled to the conductive via element; and a nonconductive support element, having a first surface and a second surface opposite to each other, wherein the conductive via element penetrates the nonconductive support element;

wherein the ground element, the feeding radiation element, and the connection radiation element are disposed on the first surface of the nonconductive support element;

wherein the first radiation element, the second radiation element, and the third radiation element are disposed on the second surface of the nonconductive support element.

2. The antenna structure as claimed in claim 1, wherein the connection radiation element substantially has an L-shape.

3. The antenna structure as claimed in claim 1, wherein the connection radiation element has a vertical projection on the second surface of the nonconductive support element, and the vertical projection at least partially overlaps the first radiation element.

4. The antenna structure as claimed in claim 1, wherein the conductive via element substantially has a conical shape.

5. The antenna structure as claimed in claim 1, wherein the second radiation element further comprises a protruding portion, and the protruding portion substantially has a rectangular shape.

6. The antenna structure as claimed in claim 1, wherein the slot is a monopole slot with a closed end and an open end.

7. The antenna structure as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

8. The antenna structure as claimed in claim 7, wherein a total length of the feeding radiation element and the first radiation element is substantially equal to 0.25 wavelength of the first frequency band.

9. The antenna structure as claimed in claim 7, wherein a total length of the feeding radiation element and the second radiation element is substantially equal to 0.25 wavelength of the second frequency band.

10. The antenna structure as claimed in claim 7, wherein a total length of the feeding radiation element and the third radiation element is substantially equal to 0.25 wavelength of the third frequency band.

* * * * *